(No Model.)

4 Sheets—Sheet 1.

S. W. VALE.
CONCENTRATING MACHINE.

No. 588,934.

Patented Aug. 24, 1897.

Witnesses,
Robert Emett

Inventor:
Stephen W. Vale,
By James L. Norris
Atty.

(No Model.) 4 Sheets—Sheet 2.
S. W. VALE.
CONCENTRATING MACHINE.
No. 588,934. Patented Aug. 24, 1897.
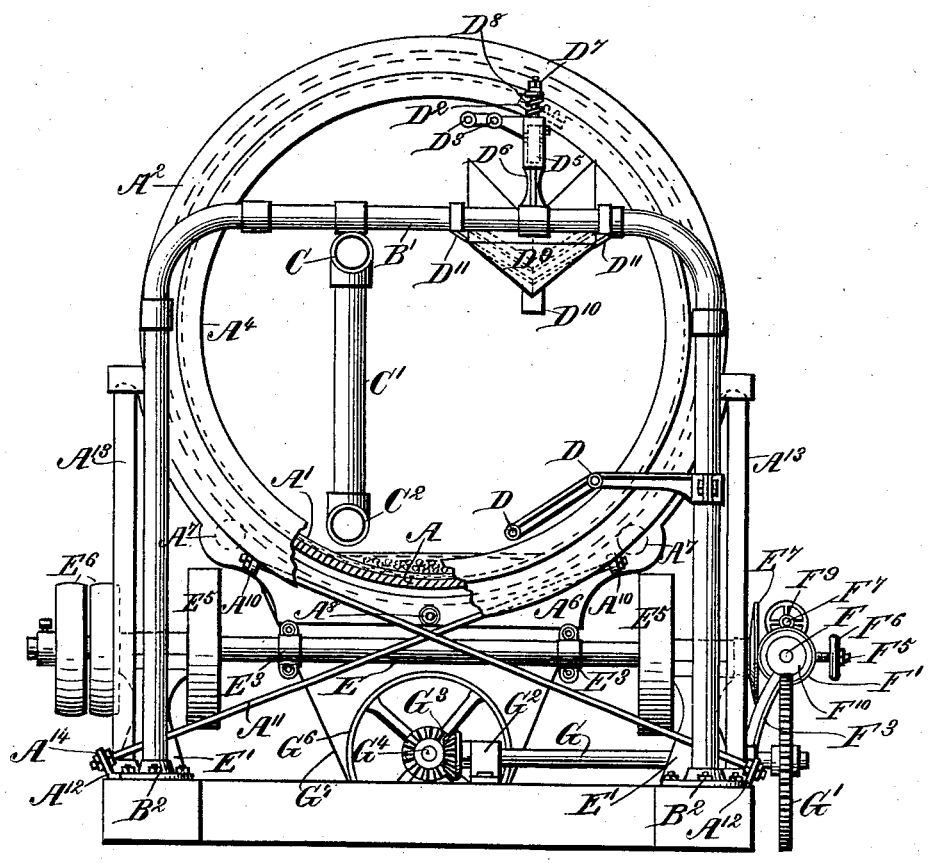
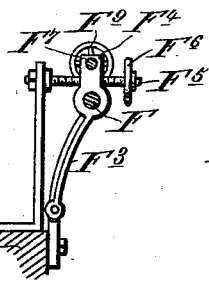
Witnesses:
Robert Ewart
J. B. Keefe
Inventor:
Stephen W. Vale.
By James L. Norris
Atty.

(No Model.)    S. W. VALE.    4 Sheets—Sheet 3.
CONCENTRATING MACHINE.

No. 588,934.    Patented Aug. 24, 1897.

Witnesses.
Robert Everett

Inventor.
Stephen W Vale.
By James L. Norris
Atty.

(No Model.)  4 Sheets—Sheet 4.
S. W. VALE.
CONCENTRATING MACHINE.
No. 588,934.  Patented Aug. 24, 1897.
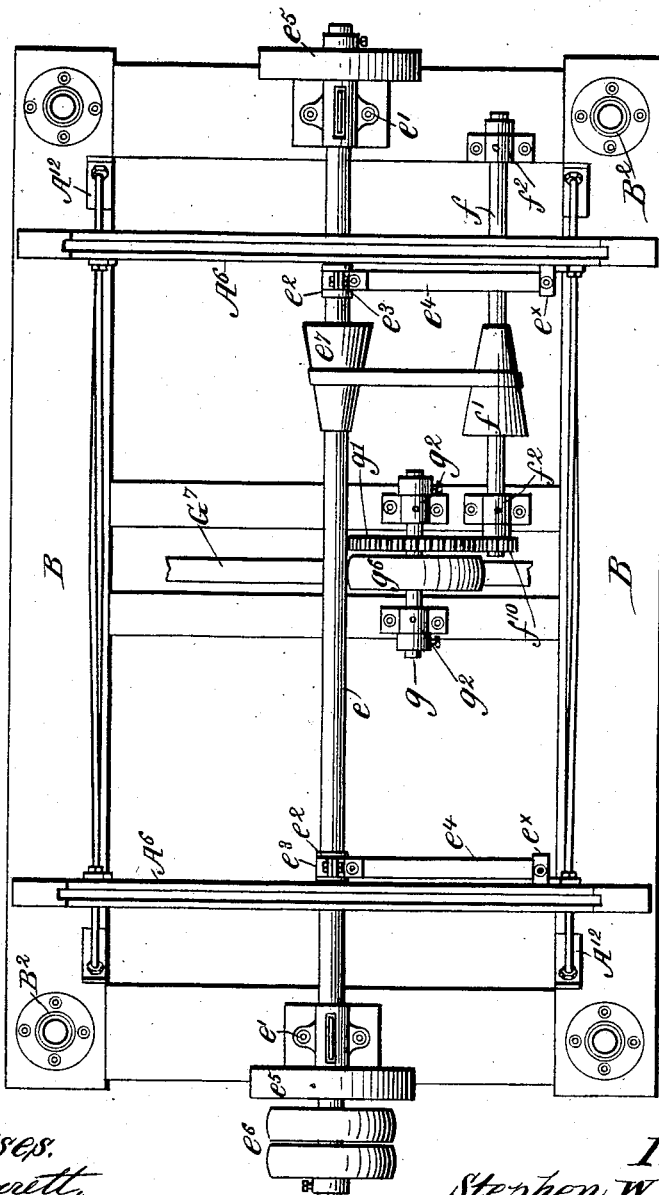
Witnesses.
Robert Everett
F. B. Keufer
Inventor.
Stephen W. Vale.
By James L. Norris.
Atty

UNITED STATES PATENT OFFICE.

STEPHEN WILLS VALE, OF ANNANDALE, NEW SOUTH WALES.

CONCENTRATING-MACHINE.

SPECIFICATION forming part of Letters Patent No. 588,934, dated August 24, 1897.

Application filed May 16, 1895. Serial No. 549,584. (No model.)

*To all whom it may concern:*

Be it known that I, STEPHEN WILLS VALE, mining engineer, a subject of the Queen of Great Britain, residing at Annandale Street, Annandale, near Sydney, in the British Colony of New South Wales, have invented a new and useful Improved Concentrating-Machine for Discrete Metalliferous and other Material, of which the following is a specification.

This invention relates to an improved concentrating-machine specially devised for the treatment of discrete metalliferous material for the separation or concentration of the more valuable particles therein, though it is equally applicable for the separation or concentration of other discrete material.

This improved concentrating-machine consists, essentially, of a barrel or vessel or cylinder to which is imparted a shaking or vibrating or jigging motion lengthwise or crosswise, in addition to a revolving motion around its own axis, through which barrel the material to be treated is caused to flow. The said vibrating and revolving vessel is open-ended, but has internal flanges or lips, so as to form a bed or recess for the material under treatment, and it is preferably lined throughout with suitable material to form a surface or surfaces to which the valuable particles will cling. The vessel is preferably cylindrical, but may be of octagonal or other polygonal form. The vessel is supported by carriers or roller frames or cradles supported upon four bearers or legs, which are so arranged as to partake of the shaking motion imparted to said vessel and its cradles and appurtenances. This shaking motion may be given either as a lengthwise or sidewise or as a percussive motion.

In order that this invention may be clearly understood, reference will now be made to the drawings herewith, in which—

Figure 1:
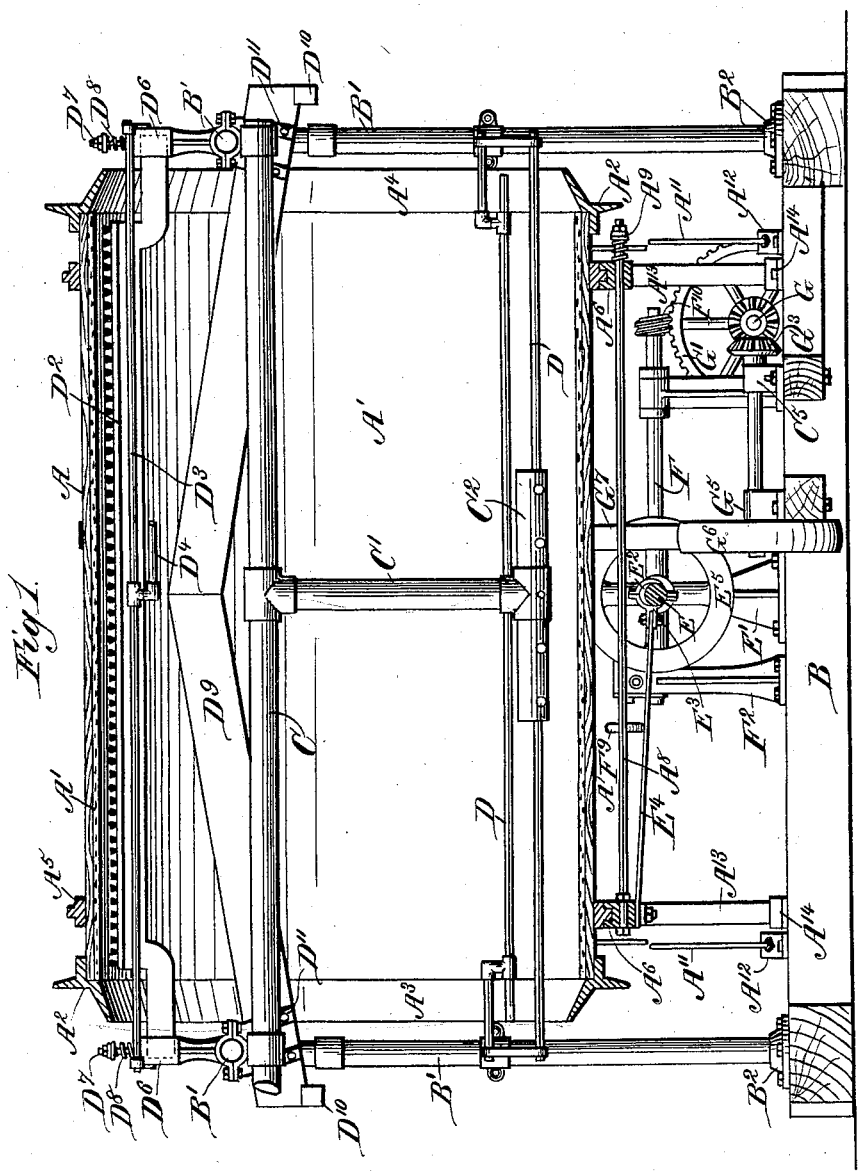
Figure 8:
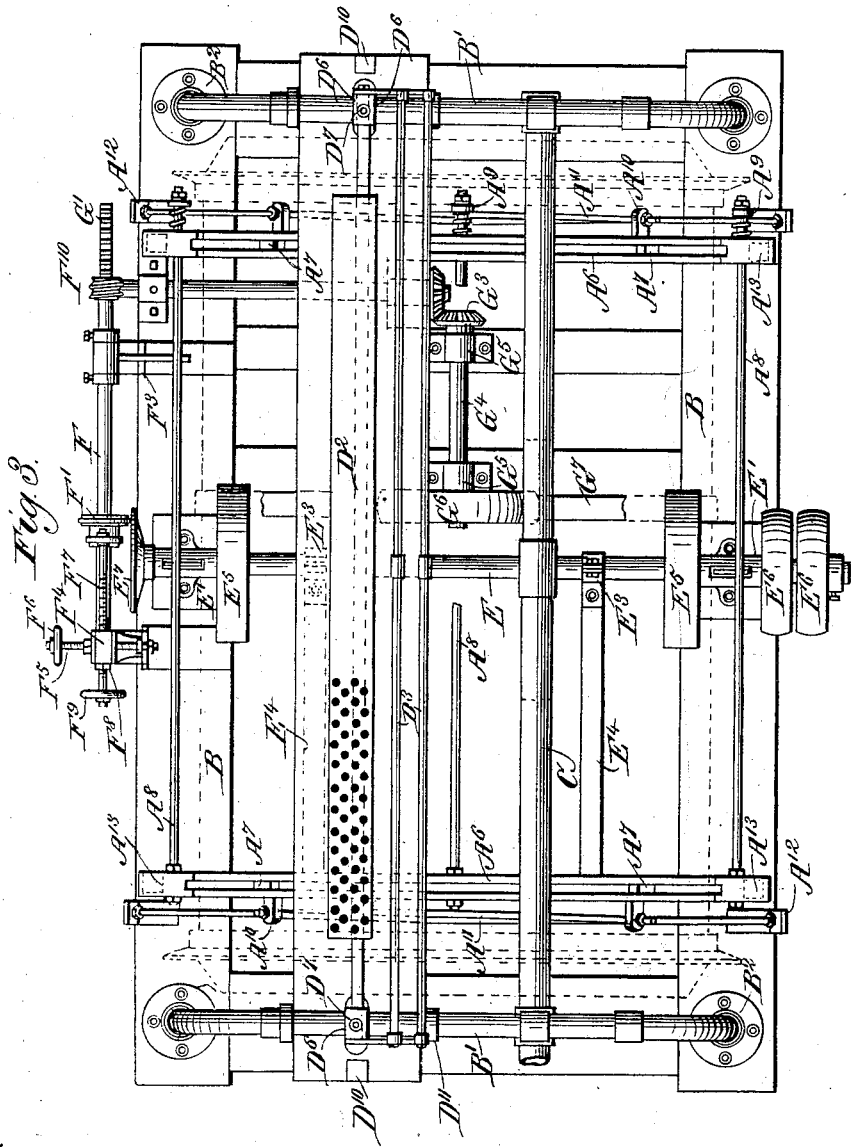

Figure 1 is a longitudinal sectional elevation, Fig. 2 an end elevation, and Fig. 3 a plan with the vessel or cylinder removed, of a concentrating-machine constructed according thereto, while Fig. 4 is a plan view of the driving-gear of a similar machine as it would be modified in order to give crosswise instead of lengthwise vibration or shaking motion to the barrel. Fig. 5 is a detail view of the means for tightening the contact between the wheels $E^7$ and F', and Fig. 6 is a similar view of the bearings of one of the uprights $A^{13}$.

The vessel or cylinder, whose outer periphery in this case is constructed of wood, (marked A,) has preferably a lining A', of clingy material, such as canvas or other textile fabric or plain or corrugated india-rubber. On either end is a hoop or ring $A^2$, whose outer part is inclined centrally as a flange or lip. One end lip is marked $A^3$ and the other end one $A^4$. These flanges or lips so form a bed or recess (seen at broken part of lip $A^4$ in Fig. 2) for the concentration and settlement of the heavier parts of the material under treatment. At either end of the barrel are rings or tracks $A^5$, engaging in carrier or cradle frames $A^6$, provided with friction-rollers $A^7$, which latter take or support the weight (see Figs. 2 and 3) of the vessel. The cradle-frames $A^6$ are stiffened by longitudinal bolts or connections $A^8$ between them, each bolt having a spring or elastic washer $A^9$ thereon, and are further stiffened by cross-bolts $A^{11}$ from lugs $A^{10}$ (see Fig. 3) to plates or brackets $A^{12}$ on the foundation or sole B of the machine, and which cross-bolts have in themselves sufficient elasticity to allow of vibration or shaking lengthwise of the vessel. The cradle, consisting of elastically-conjoined frames $A^6$, is supported on spherical or round tops of four legs or uprights $A^{13}$, whose feet also are rounded and take in step or foot pieces $A^{14}$ on the foundation or sole B. These legs $A^{13}$ have thus sufficient stiffness and at the same time sufficient elasticity to allow of the movement of the cradle and the vessel. At either end of the vessel are braces or arched supports B' for the feed and discharge appurtenances, and these are preferably made of piping, with flanged bases $B^2$ bolted to the sole or foundation B. Suspended to this brace or arch is feed-pipe C, having central down branch C' and perforated distributer $C^2$, the end of said pipe C leading from a pump or hopper or reservoir of water and material for treatment. Fixed to the legs of this brace or arch B' are washing-jets or perforated pipes D and D', from which jets water is directed upon the leading part of the periphery of the revolving vessel A as it leaves the bed or recess formed by the lips $A^3$ and $A^4$, Figs. 1 and 2, and so wash back the sand and smoother material, while the valuable clingy particles are carried upwardly. The lighter particles or gangue are meanwhile continuously flowing over the flanges or lips $A^3$ and $A^4$ and conveyed in a convenient manner to waste. To the upper part of this brace or arch $B'$ is affixed an arrester or scraper or brush $D^2$, at whose point of contact with the lining $A'$ is directed discharge or removal jets of water from perforated pipes $D^3$, fed by pipe $D^4$ from a convenient source. This brush $D^2$ is held up in slot $D^5$ of brackets $D^6$ by means of stud-bolt $D^7$, on which is spring $D^8$, which serves to insure adjustable elastic contact of brush $D^2$ upon the lining. The pipes $D^3$ are supported by brackets from brackets $D^6$. Under these jets and the brush $D^2$ is a receiving trough or launder $D^9$, having discharge-nozzles $D^{10}$, said trough or launder being supported by hangers $D^{11}$ from arch $B'$. These parts of the machine—namely, a vessel with a clingy internal periphery, plain or ribbed or corrugated lengthwise or crosswise and with flanges or lips, so as to form a working bed or recess at the bottom of said barrel and the feed-pipe and discharge appurtenances—have mechanism to impart the necessary revolving and vibrating or shaking motion, and so far as I am at present aware the following particular combinations and arrangements of parts are the best:

The driving or main shaft E has bearings in brackets $E'$ on side beams of the foundation or sole B. On said main shaft are eccentrics or cams $E^2$, having straps $E^3$ and rods $E^4$ to the bottom of one of the frames $A^6$ of the cradle of the vessel, to which is thus imparted a vibration or shake, according to the throw of the eccentrics or cams $E^2$. On said main shaft E are also fly-wheels $E^5$, driving fast and loose pulleys $E^6$ and friction pulley or disk $E^7$, the face of the latter being in driving contact with edge of friction-pulley $F'$ on spindle F in bearings in brackets $F^2$ and $F^3$ from the foundation or sole B, the former, $F^2$, having hinge or jointed part $F^4$ and retaining or holding screw $F^5$, with hand-wheel $F^6$ for tightening contact between wheels $E^7$ and $F'$ or for loosening altogether, so as to stop spindle F while yet the main shaft E revolves. The pulley $F'$ slides upon a feather on its spindle F, and its position relative to the center of pulley $E^7$ and shaft E is adjustable by means of screw $F^7$, which carries at one end a collar $f$, that is loosely affixed to the friction-pulley $F'$, the said screw $F'$ working in nut or female screw $F^8$, having hand-wheel $F^9$, by turning which the speed of spindle F relative to that of shaft E is regulated, and thus the revolution of the vessel adjusted without respect to the number of its shakings or vibrations. A worm-wheel or endless screw $F^{10}$ on spindle F works on gears into a spirally-toothed wheel $G'$ on cross-shaft G in bearings $G^2$ and having miter-gearing $G^3$ to spindle $G^4$ in bearings $G^5$, having thereon pulley $G^6$, around which and around the vessel or cylinder A or a cylindrical facing thereon passes the endless belt $G^7$ for giving the necessary motion to said vessel.

In the modification shown in Fig. 4 the construction of the barrel, the feed and discharge appurtenances, the cradle-frames, and the foundation or sole are the same or substantially the same as those described with reference to Figs. 1, 2, and 3, and the mechanism for giving the motions with minor alterations of parts is as follows: The longitudinal bolt $A^8$ or the spring or washer $A^9$ on said longitudinal bolt, Figs. 1 and 3, would be dispensed with. There would be longitudinal side rods crossing one another from brackets on the foundation or sole similar to brackets $A^{12}$, Figs. 1, 2, and 3, for a similar purpose to the cross-bolts $A^{11}$ of Figs. 1, 2, and 3, which cross-bolts would be dispensed with. The main shaft $e$ is longitudinal and has bearings $e'$, eccentrics or cams $e^2$, with straps $e^3$, and rods $e^4$ to lugs $e^\times$ on bottom of cradle-frames A, and this shaft also has fly-wheels $e^5$, driving-pulleys $e^6$, and cone-pulley $e^7$ with endless belt to similar cone-pulley $f'$ on counter-shaft $f$ in bearings $f^2$, and having pinion $f^{10}$ gearing into wheel $g'$ on shaft $g$ in bearings $g^2$, which shaft has thereon pulley $g^6$ for taking the endless belt which passes around the vessel or cylinder and revolves it.

It is to be understood that though the best way at present known to me of carrying this invention into practical effect is shown and described, yet its mechanical details may be extensively varied without departing from the nature and essence of its principal features.

Having now particularly described and explained the nature of my said invention and in what manner the same is to be performed, I declare that what I claim is—

1. In a concentrating-machine for discrete metalliferous and other material, the combination of a revolving cylinder lined with clingy material and provided at its opposite ends with annular, frusto-conical flanges extending inwardly toward the axis of the cylinder, a scraper supported in elastic contact with said lining for removing the material therefrom, means for yieldingly supporting said cylinder, and means for vibrating the support and cylinder, substantially as described.

2. In a concentrating-machine of the class described, the combination with a cylinder having annular flanges $A^5$, of grooved cradle-frames $A^6$ elastically braced and joined together and in which said annular flanges are adapted to rotate, vibratory supports movably supporting said cradle-frames, and mechanism for vibrating and rotating said cylinder, substantially as described.

3. In a concentrating-machine of the class described, the combination of a cylinder A, of cradle-frames $A^6$ elastically joined together and in which said cylinder is adapted to revolve, uprights $A^{13}$ having rounded ends fitted in correspondingly-shaped sockets on the cradle-frames and on the base of the machine, means for vibrating said cradle-frames and the contained cylinder, and mechanism for rotating the cylinder in said cradle-frames, substantially as described.

4. In a concentrating-machine of the class described, the combination with a barrel A, of cradle-frames $A^6$ in which said barrel is adapted to revolve, said frames being joined together by longitudinal connections $A^8$ having springs $A^9$, cross-rods $A^{11}$ for bracing said cradle-frames, a driving-shaft E having mounted thereon eccentrics $E^2$, rods $E^4$ connected at one end to one of said cradle-frames and provided at their other ends with straps $E^3$ engaging said eccentrics, and driving mechanism actuated by said main shaft for rotating the barrel A, substantially as described.

5. In a concentrating-machine of the class described, the combination with a barrel A adapted to rotate in cradle-frames $A^6$ elastically joined together and movably supported, a driving-shaft E, means actuated by said shaft for vibrating the cradle-frames, a friction-disk $E^7$ mounted on one end of the driving-shaft, a spindle F having keyed thereon a friction-pulley $F'$ in engagement with the disk $E^7$, a worm $F^{10}$ on said spindle engaging a worm-wheel $G'$ mounted on a shaft G, a shaft $G^4$, miter-gearing $G^3$ connecting the shafts G and $G^4$, a pulley $G^6$ mounted on the shaft $G^4$, and an endless belt $G^7$ passing about said pulley and the barrel A for revolving the latter, substantially as described.

6. In a concentrating-machine of the class described, the combination with a barrel A adapted to revolve in cradle-frames $A^6$, of the driving-shaft E, friction-pulley $E^7$ mounted thereon, the spindle F mounted in the bearing $F^3$ and hinged bearing $F^2$, the adjusting-screw $F^5$ for moving the spindle toward and away from the shaft E, the friction-pulley $F'$ keyed on the spindle F and engaging the friction-pulley $E^7$, an adjusting-screw $F^7$ for adjusting friction-pulley $F'$ longitudinally on said spindle, and means actuated by said spindle for revolving the barrel A, substantially as described.

7. In a concentrating-machine of the class described, the combination with a barrel A having inwardly-projecting end flanges and means for imparting a combined rotary and vibrating movement thereto, of a water-feed pipe C having perforated distributer $C^2$, washing-jets D and $D'$, a scraper $D^2$ arranged in contact with the upper, inner periphery of the barrel A, jets $D^3$ operating to spray water on said scraper for removing the material collected thereby, and an inclined discharge-trough $D^9$ arranged beneath said scraper, substantially as described.

Dated this 21st day of March, 1895.

STEPHEN WILLS VALE.

Witnesses:
FRED WALSH,
THOMAS JAMES WARD.